(12) United States Patent  
Kueperkoch et al.

(10) Patent No.: US 7,877,177 B2  
(45) Date of Patent: *Jan. 25, 2011

(54) FAULT-TOLERANT VEHICLE STABILITY CONTROL

(75) Inventors: Stefan Kueperkoch, Holzgerlingen (DE); Wolfgang Grimm, Allison Park, PA (US); Aleksandar Kojic, Cupertino, CA (US); Jasim Ahmed, Mountain View, CA (US); Jean-Pierre Hathout, San Jose, CA (US); Christopher Martin, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 321 days.

This patent is subject to a terminal disclaimer.

(21) Appl. No.: 11/810,594

(22) Filed: Jun. 5, 2007

(65) Prior Publication Data

US 2008/0059018 A1 Mar. 6, 2008

Related U.S. Application Data

(62) Division of application No. 10/370,635, filed on Feb. 19, 2003, now Pat. No. 7,245,995.

(51) Int. Cl.  
*B60T 8/88* (2006.01)

(52) U.S. Cl. .......................................... 701/34; 180/21

(58) Field of Classification Search .................. 701/1, 701/33, 34, 36, 39, 43; 180/7.1, 21, 65.8  
See application file for complete search history.

(56) References Cited

U.S. PATENT DOCUMENTS

| 5,120,982 | A | * | 6/1992 | Yopp et al. ................. 307/10.1 |
| 5,212,640 | A | | 5/1993 | Matsuda |
| 5,274,554 | A | * | 12/1993 | Takats et al. .................. 701/33 |
| 5,375,057 | A | | 12/1994 | Ackermann |
| 5,957,985 | A | | 9/1999 | Wong |
| 6,027,183 | A | | 2/2000 | Katayose et al. |
| 6,202,009 | B1 | | 3/2001 | Tseng |
| 6,223,104 | B1 | | 4/2001 | Kamen |

(Continued)

FOREIGN PATENT DOCUMENTS

EP 1 215 097 6/2002

(Continued)

OTHER PUBLICATIONS

Henke, *ABS to ESP*, http://www.whnet.com/4x4, 2002.

(Continued)

*Primary Examiner*—Dalena Tran  
(74) *Attorney, Agent, or Firm*—Kenyon & Kenyon LLP

(57) ABSTRACT

A system and method for providing a fault tolerant vehicle dynamics control (VDC) is described. The system includes a fault tolerance module that receives an indication of a fault in at least one of the actuators of the VDC and selects a fault compensation mode to maintain the stability of the motor vehicle in light of the received fault indication. The fault tolerance module proceeds by diagnosing at least one fault in at least one of the actuators, selecting a fault compensation mode based on the detected at least one fault and the driving condition, and compensating for the at least one fault by optimally controlling remaining operable actuators according to the fault compensation mode.

11 Claims, 6 Drawing Sheets

U.S. PATENT DOCUMENTS

| | | | |
|---|---|---|---|
| 6,421,790 B1 * | 7/2002 | Fruehling et al. | 714/30 |
| 6,490,516 B1 | 12/2002 | Henneken et al. | |
| 6,502,025 B1 | 12/2002 | Kempen | |
| 6,519,515 B1 | 2/2003 | Baumann et al. | |
| 6,643,569 B2 * | 11/2003 | Miller et al. | 701/29 |
| 6,647,959 B2 * | 11/2003 | Noguchi | 123/396 |
| 6,729,432 B1 | 5/2004 | Yao et al. | |
| 2004/0181329 A1 | 9/2004 | Tseng et al. | |

FOREIGN PATENT DOCUMENTS

| | | |
|---|---|---|
| JP | 10-273032 | 10/1998 |
| JP | 11-048945 | 2/1999 |
| JP | 11-165567 | 6/1999 |
| JP | 2000-82198 | 3/2000 |
| JP | 2000-272492 | 10/2000 |
| JP | 2001-13882 | 5/2001 |
| JP | 2002-178904 | 6/2002 |

OTHER PUBLICATIONS

Ackermann et al., *Driving Safety by Robust Steering Control*, at 44, No. 5, 219-225, Oldenbourg-Verlag, 1996.

Ackermann et al., *Safe and Comfortable Travel by Robust Control*, Trends in Control (Isidori et al. ed.), 1-16, Springer 1995.

Isermann, *Diagnosis Methods for Electronic Controlled Vehicles*, 5$^{th}$ International Symposium on Advanced Vehicle Control, 2000.

* cited by examiner

FAULT-TOLERANT VEHICLE STABILITY CONTROL

CROSS-REFERENCE TO RELATED APPLICATION

This application is a division of prior application Ser. No. 10/370,635, filed Feb. 19, 2003 now U.S. Pat. No. 7,245,995.

FIELD OF THE INVENTION

The present invention relates to electronic control systems for motor vehicles, and relates more particularly to a method and system for extending the capability of existing vehicle dynamics controllers (VDCs) and/or Electronic Stability Programs (ESPs) in order to detect and compensate for failures in any of the various actuators used to maintain the stability of the vehicle in a VDC system.

BACKGROUND INFORMATION

Currently, many motor vehicles are equipped with a VDC system such as an ESP in order to promote driving safety. The purpose of a VDC system is to maintain the lateral stability of the motor vehicle and thereby prevent a driver from plowing, skidding, or fishtailing during challenging driving conditions. Most VDC systems accomplish this by extending the functionality of the anti-lock braking system (ABS) via a control strategy that provides modulated braking at each individual wheel to induce a yaw moment and/or to adjust the lateral acceleration at each wheel. Some newer systems also use active steering to modulate the driver's control input at the steering wheel which alleviates effects of driver overreaction (or underreaction) during the occurrence of disturbing yaw moments, and also during normal driving. Active steering operates via an additional actuator coupled to the steering system that reacts immediately by introducing a signal to a steering control signal in situations when unexpected yaw moments occur.

The VDC system typically determines current driving conditions using detected parameters and then compares the determined conditions with driver inputs. The VDC uses this information to correct the course of the vehicle in critical situations. Several directly measured parameters are provided as inputs to the system including wheel speed ($v_{wh}$), steering angle ($\delta$), vehicle yaw rate ($\dot{\psi}$), lateral acceleration ($a_y$), and brake pressure ($P_{br}$), among other measured dynamic parameters. From these inputs several additional dynamics parameters are derived and calculated and then compared to nominal values, i.e., desired lateral dynamics derived from the driver's input. These variables may include the yaw rate and the side slip angle ($\beta$) among other vehicle dynamics parameters. Whenever a discrepancy between a variable determined from actual driving conditions and a nominal value is detected, individual wheel slip actuators, such as hydraulic brake valves are actuated to compensate for the discrepancy by modifying the vehicle dynamics, which generally brings the driven vehicle back toward the desired course (other types of actuators may also be used to enhance vehicle stability). For example, when a vehicle oversteers, or fishtails, the outside wheel or wheels may be braked to induce a yaw moment that would counteract the discrepancy. When understeering, or plowing, the rear inside wheel may be braked to achieve the opposite effect. Other combinations of wheels may be activated depending on the version of the VDC system, and the driving situation.

Since the VDC system is a complex, integrated system that relies on the integrity of each of the actuator components to provide flexibility and safety in a wide range of dangerous driving situations as they occur in real time, if any of the actuators was to fail, the VDC typically fails to function entirely, and is automatically switched off. There is as of yet no alternative control system that may be activated in the case of such failure that can compensate for the loss of function in one or more of the VDC actuators. This is a substantial functional disadvantage for any VDC system, and it is a particularly major difficulty for those VDC systems that include electro-mechanical brakes (EMB), which are expected to replace hydraulic brakes in certain motor vehicles. As these brakes do not work on a 'purely' mechanical principle, a mechanical backup cannot be applied if there is a failure in one or more of these brakes. Therefore, systems that employ these brakes require a high degree of fault tolerance and must fail operational.

It would therefore be beneficial to provide a fault-tolerant VDC system that can remain active despite the failure of one or more VDC actuator components, and that has the capability to compensate for such failure and maintain vehicle safety during dangerous driving conditions.

SUMMARY OF THE INVENTION

It is therefore an object of the present invention to provide a fault tolerant VDC system for a motor vehicle.

According to one embodiment, a fault tolerant VDC system includes VDC actuators (actuators that are part of the VDC system) and a fault tolerance module configured to receive an indication of a fault in at least one of the VDC actuators and sensors and to select a fault compensation mode to maintain the stability of the motor vehicle in light of the received fault indication. According to a particular implementation, the fault tolerant VDC system according to the present invention also includes an extended VDC controller that stores algorithms corresponding to fault compensation modes and controls remaining operable VDC actuators based on the fault compensation mode algorithm selected by the fault tolerance module.

The present invention also provides a method for providing fault tolerance for a VDC system that controls a plurality of actuators to maintain the stability of a motor vehicle during challenging driving conditions. The method includes diagnosing a fault in at least one of the actuators, selecting a fault compensation mode or optimizing a control algorithm based on the detected at least one fault and the driving condition, and compensating for the at least one fault by controlling remaining operable actuators according to the fault compensation mode or optimized control algorithm. According to one implementation, the method employs a rules-based decision making process for selecting the fault compensation mode.

DETAILED DESCRIPTION

Figure 1:
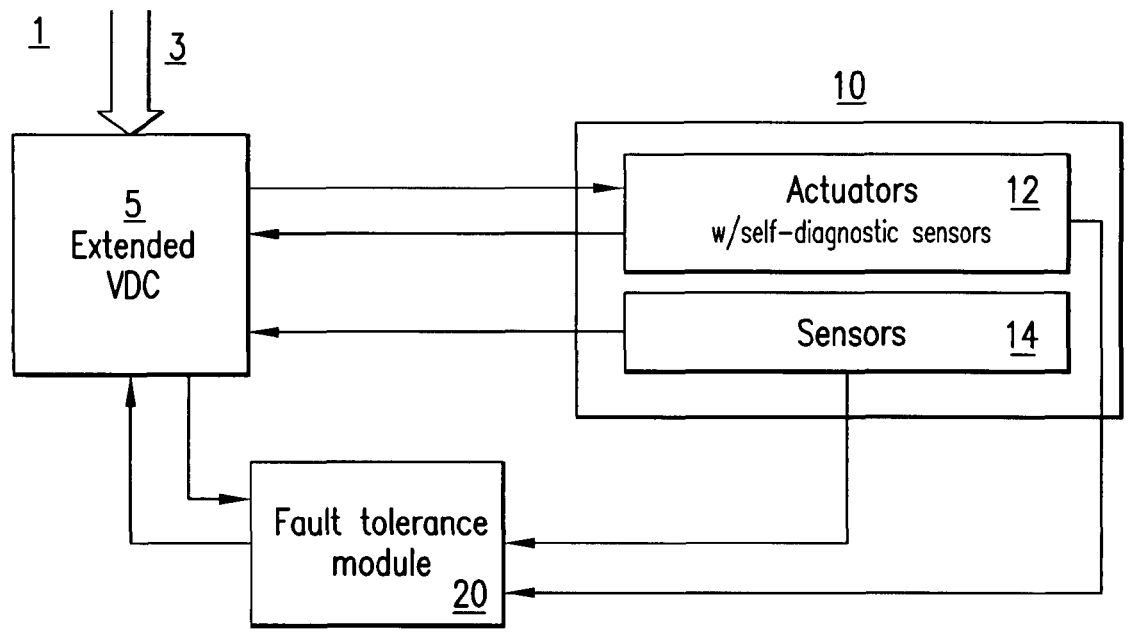
FIG. 1 illustrates an embodiment of the fault-tolerant VDC system 1 according to the present invention including self-diagnostic actuator sensors.

FIG. 1 shows an embodiment of the fault-tolerant VDC system 1 according to the present invention. A driver of a motor vehicle controls a steering wheel and a pedal accelerator. Signals from these devices, together denoted as driver input signals 3, are supplied to an extended VDC system 5 (hereinafter termed the "VDC") which includes a microprocessor or electronic control unit for executing an ESP and any memory resources, such as DRAM, SRAM, and/or ROM units, that enable or facilitate execution of the VDC. As will be described further, the VDC 5 according to the present invention includes a number of distinct control algorithms for compensating for a failure, or fault, in one or more of the actuators used by the conventional VDC using the remaining functional actuators. When a fault is detected, a control algorithm tailored for countering the particular detected fault is selected for execution.

The VDC 5 uses the driver signals 3 to derive nominal or 'desired' values for certain vehicle dynamics parameters. The VDC 5 also receives input from vehicle sensors 14 such as, for example, wheel speed, yaw rate, steering angle, lateral acceleration, brake pressure and in-wheel motor current (for torque control) sensors positioned in mechanical elements 10 of the motor vehicle such as the wheels, drivetrain and steering wheel. As in conventional VDC systems, the VDC 5 processes the inputs from the driver 3 and the vehicle sensors 14 and transmits signals to vehicle actuators 12 such as wheel brake valves, and steering wheel adjustment actuators over any embedded control network bus, such as a control area network (CAN), to adjust the vehicle dynamics depending upon whether the received input indicates that an intervention by the VDC is necessary.

According to a first embodiment of the VDC system 1 of the present invention, the vehicle actuators 12 include electrohydraulic (EHB), electromechanical (EMB) or any other braking system that is equipped with self-diagnostic fault detection actuator sensors. Additionally, the vehicle actuators may include electric motor wheel accelerators, with self-diagnostic capability, which may be implemented in internal-combustion based vehicles using electric motors coupled to the shaft. With such self-diagnostic actuator sensors, these actuators can detect when a fault in the brakes occur and can generate and send a "failure" signal to the VDC 5 alerting the VDC that a fault in the respective actuator, such as, for example, a loss of brake pressure, has occurred.

Figure 2:
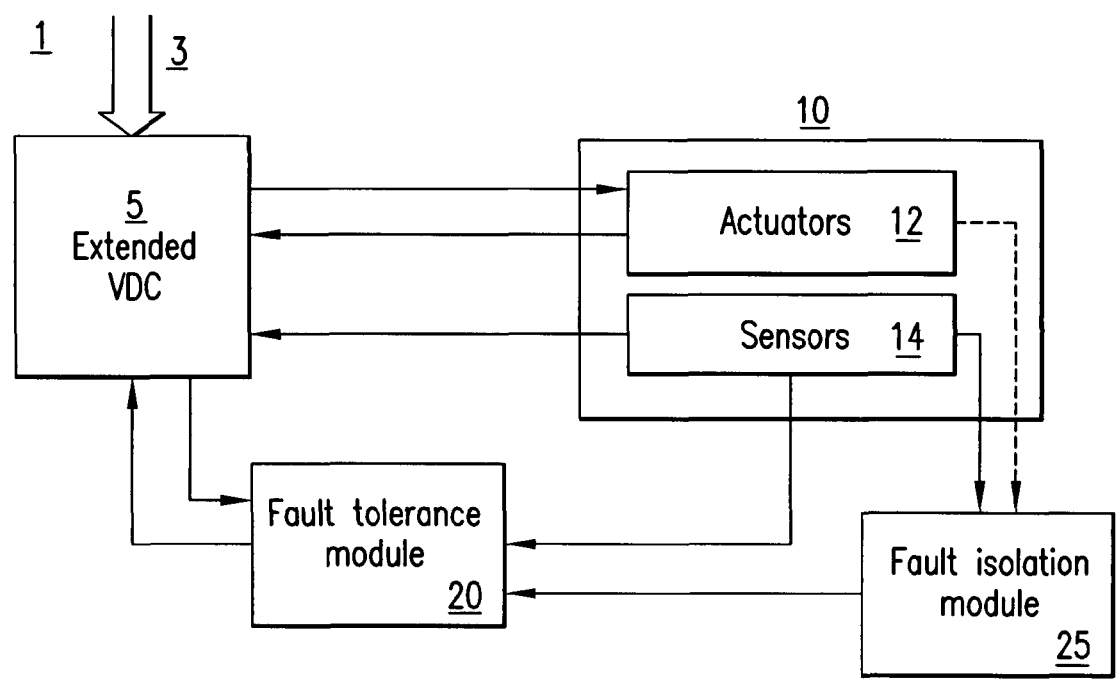
FIG. 2 illustrates a second embodiment of the VDC system 1 of the present invention including a fault isolation module.

FIG. 2 shows a second embodiment of the VDC system 1 according to the present invention applicable to legacy systems that do not include self-diagnostic actuators. In FIG. 2, a fault isolation module 25, which may be implemented using a microprocessor or an application specific integrated circuit including a digital signal processor, receives signals from the vehicle sensors 14, estimates various vehicle dynamics parameters from the sensor input, detects if one or more discrepancies exist, and then conducts a fault diagnosis, i.e., if a significant discrepancy exists, the fault isolation module determines whether one or more of the actuators that are part of the VDC ('VDC actuators') is faulty. As discussed in greater detail below, the fault diagnosis performed may be based on a decision-making process, such as, for example, a hierarchical rules-based system using a "fault tree," or other automated decision-making processes.

Failure detection signals arising from the self-diagnostic actuator sensors 14 or fault diagnosis information generated by the fault isolation module 25 are delivered to a fault-tolerance module 20. The fault tolerance module 20, which may either be incorporated into the VDC processor, or implemented as a distinct electronic processor, selects a VDC control algorithm, or compensation mode, appropriate for a given driving situation given the constraints on VDC functionality imposed by the diagnosed failure of one or more of the actuators that are part of the VDC system.

Figure 3:
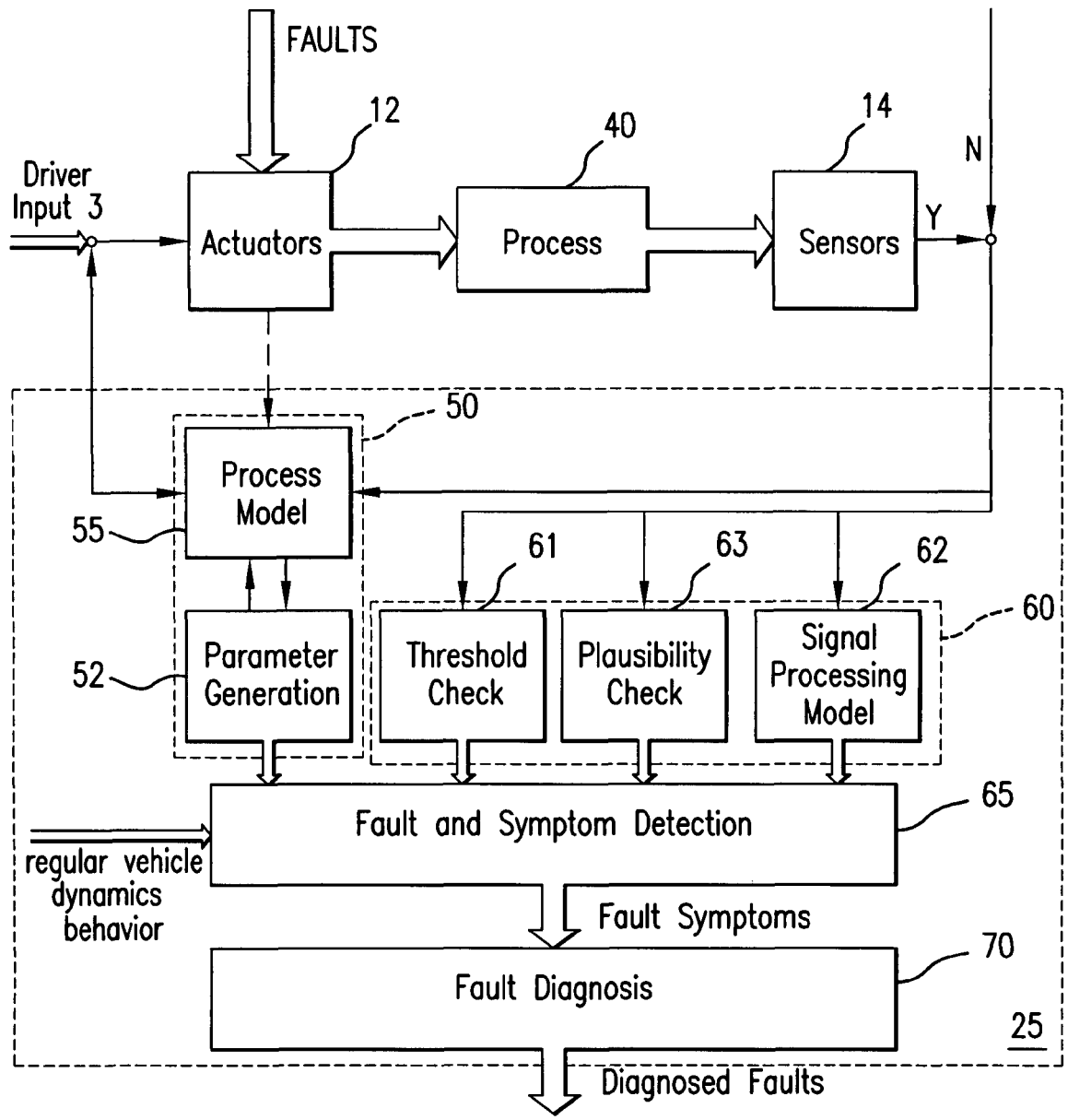
FIG. 3 illustrates an embodiment of the fault isolation module according to the present invention.

FIG. 3 illustrates an embodiment of the fault isolation module according to the present invention. As noted above, driver inputs are delivered as electrical signals to the actuators 12 in a drive-by-wire capable vehicle, and the resulting operation of the actuators effect dynamic processes 40 which include such processes as pump-braking one or more wheels, turning the front wheels, altering the position of a throttle valve, etc. As noted above, electrical actuators may also output diagnostic signals indicative of their state. In any case, the normal operation of one or more of the actuators may be disturbed by faults. As the motor vehicle is driven, a time-series of vehicle dynamics parameters are detected by sensors 14 which generate output signals Y corresponding to the detected parameters. The output Y may be contaminated by some amount of noise N. The sensor output signals Y are input to both a model-based fault detection module 50 and a signal-based fault detection module 60 of fault isolation module 25. Each of these modules can be used to detect the occurrence of a fault at one or more of the actuators. These fault detection schemes can also be used to detect failures in the mechanical transmission system of the vehicle and/or the sensors 14 in addition to failures in the actuators, if desired.

The signal-based fault detection module 60 performs checks on single signals arising from a particular sensor. Signal-based checks include limit value checking of thresholds or tolerances 61 for determining whether a sensed signal has passed a given limit, range plausibility checks 63 of signal value ranges (e.g., changes that defy the laws of physics), and also signal-processing model based checks 62 in which techniques such as fast Fourier transforms and correlation functions are used to detect abnormalities in signal shape. The signal-based fault detection module provides the advantages that it can be easily implemented, uses only one input measure for analysis at a time, and while the fault coverage it provides can be limited, its results are highly reliable.

The model-based fault detection module 50 relates the input 3 to the actuators and the output Y from the sensors to each other. The mathematical techniques employed by this model-based fault detection module 50 allow for the detection of a variety of different types of faults using only a few measured variables. These techniques generally involve generation of metrics or parameters such as residuals, state estimates and modeled quantities. Particular parameters may not correspond to any single measured physical motor dynamics variable, but nevertheless can function as key metrics in determining deviations from regular driving conditions.

As discussed in the article "*Diagnosis Methods for Electronic Controlled Vehicles*," by R. Isermann in Vehicles Systems Dynamics (2001), there are three main types of model-based fault detection techniques: parameter estimation; state estimation; and parity equations. The model-based fault detection module may use any one, or any combination of the three types in detecting a fault. In parameter estimation, various reference parameters are first generated (block 52) according to an input-output process model (represented by block 55). The computed model parameters are then compared with actual measured parameters from sensor output Y. The comparison can indicate the appearance and sometimes also the magnitude of faults. Parameter estimation techniques have the advantage that from even a small number of modeled input-output processes, a large amount of information in terms of parameter deviations can be obtained. In addition, parameter estimation techniques are generally less susceptible to noise than some of the other fault detection methods.

In state estimation, a state space formulation of the vehicle dynamic system $$\dot{x}(t)=Ax(t)+Bu(t)$$

$$y(t)=Cx(t)+Du(t) \quad (1)$$

is used for modeling faults of input/output systems (particularly multi-input/multi-output systems). A, B, C and D represent parameter matrices, e.g., $[a_1, a_2, a_3 \ldots a_n]$, but need not be constants. Faults in this system show up as additive faults to the output y(t) and also to variations in system matrices $\underline{A}$, $\underline{B}$, $\underline{C}$, and $\underline{D}$ e.g., $\underline{A}_{faulty}=\underline{A}+\Delta \underline{A}$. A bank of output signal (state) "observers" (not to be confused with the sensors) are excited by changes in one or more output signals; the remaining output signals are then reconstructed and compared with measured output signals Y to determine the presence of actuator faults. Parity equations compare a reference model of for a measured behavior based on a fixed parameter linear model against outputs Y to obtain derivative parameters referred to as residuals that are useful in indicating faults. In each of these techniques, filters can be designed to pick out particular characteristics of residuals or parameters for fault detection. Both state observers and parity equations are particularly useful for detecting additive faults such as offsets, whereas parameter estimation techniques are often better suited for detecting multiplicative (parametric) faults. Therefore, a combination of model-based fault detection techniques may be optimal for full fault-detection coverage.

Both the signal-based fault detection and the model-based fault detection modules 50, 60 output parameter information to a fault and symptom detection module which processes this information and outputs fault "symptoms" to a fault diagnosis module 70. The fault diagnosis module which uses the symptoms to determine "attributes" of an occurring fault including its location, type, magnitude, timing and duration. In addition, by the magnitude of the fault, the fault diagnosis can determine if a failure in one of the actuator components, that is, a loss of functional integrity of those components, has occurred. One of the techniques that may be employed in fault diagnosis is static fault-tree analysis, which is a hierarchical rules-based system for decision making. In the fault tree, the symptoms generated by the fault detection modules 50, 60 can be used as the "leaves" of the tree. The leaves are combined in various if-then statements at higher levels of the fault tree. For example, if both parameter(condition) X and Y exist or parameter Z exists, then an intermediate condition C, or a fault F, is determined to have occurred.

Figure 4:
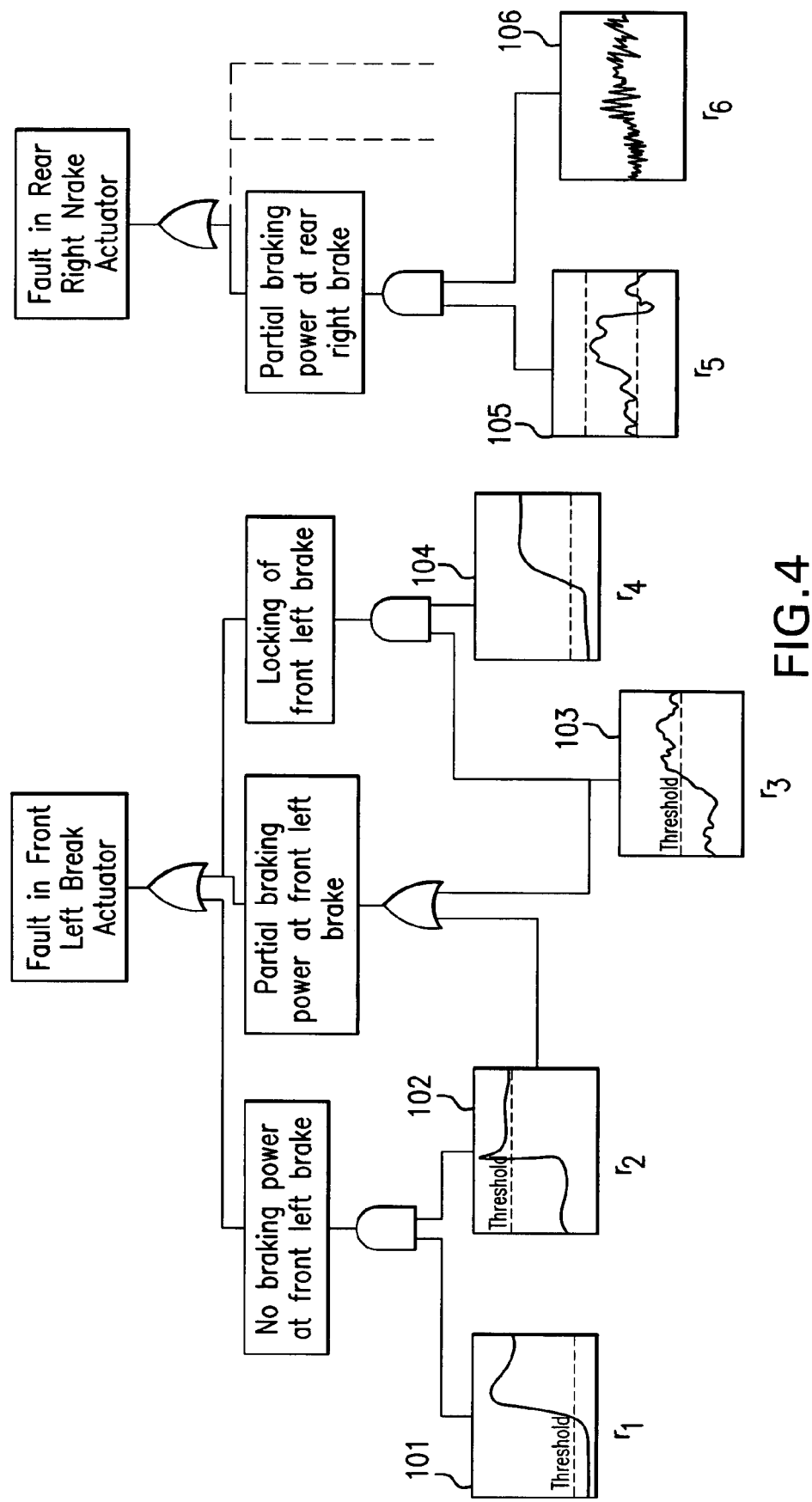
FIG. 4 illustrates an example of a section of a fault tree structure for diagnosing failures at one or more of the actuators used in the VDC system that may be used in the context of the extended VDC system of the present invention.

FIG. 4 shows an example of a section of a fault tree structure for diagnosing failures at one or more of the actuators used in the VDC that may be used in the context of the extended VDC system of the present invention. As discussed above, the model-based fault detection module 50 can generate residual parameters as a time series that can be analyzed in combination to determine a dynamic state of the VDC actuators. As shown in FIG. 4, miniature graphs 101, 102, 103, 104, 105, 106 depicting time series data for six respective residual parameters r1, r2, r3, r4, r5, r6 comprise the leaves of a section of the fault tree. Each of the residual parameters may be related to and contain information about the dynamic parameters including but not limited to: the difference between front wheel speeds ($'_f$), the difference between rear wheel speeds ($'_r$) wheel slip angles ($\alpha$), the steering angle ($\delta$), cornering stiffnesses of front ($c_{fs}$) and rear ($c_{rs}$) tires, the vehicle yaw rate ($\dot\psi$), vehicle forward velocity (V), and lateral force on the tires ($F_y$). As these dynamics variables change over time, the residuals will also vary to some extent. When one or more of the variables changes abruptly due to an actuator fault, this change may be reflected in one or more of the residual parameters which will then be "symptomatic" of the actuator fault.

In the example fault tree section depicted, the graphs 101, 102 indicate that residuals r1, r2 have abruptly increased, indicating a discrepancy. In each graph a threshold level is shown, such that if the threshold is exceeded, a discrepancy flag or alert can be set. However, other metrics such as the shape of the graph of the residual parameter and/or its frequency can be analyzed to set a discrepancy flag. The graphs 101, 102 are shown coupled via an "and-gate" to an intermediate event indication "no braking power at front left brake." In this case, if flags for both r1, and r2 have been set due to the exceeding of a threshold or otherwise, then the fault diagnosis module determines that there is currently no braking power at the front left brake. It is noted that the "and-gate" coupling of the residual conditions in the fault tree means that the intermediate condition, the determination that the left front brake has no braking power, will not occur unless the time series of both residual r1 and residual r2 indicate a sufficient fault symptom. A fault symptom in either without the other will accordingly not be sufficient to trigger a diagnosis of a complete loss of braking power in the front left brake.

Similarly, a fault symptom in the time series of both r3 and r4 would be necessary for the fault diagnosis module to determine that the left front brake has locked. On the other hand, the residuals r2 and r3 are coupled by an "or-gate" to the condition "partial braking power at the front left brake." This intermediate condition indicates a less severe symptom than a brake locking or a complete loss of braking power, and the conditional requirements are correspondingly less onerous, in that a discrepancy in either the time series of r2 or r3 will bring about a determination of a condition of partial braking power at the left front brake actuator.

Since each of the intermediate conditions with regard to the front left brake, i.e., complete loss of power, partial loss of power and locking, can impair the effectiveness of the VDC control system in unusual or unsafe driving conditions, each of these conditions is "or-gated" to a final fault determination. Thus, any one of these conditions will cause the fault diagnosis module to determine that a significant fault exists at the front left brake actuator.

At the right side of the fault tree, residuals r5 and r6 are "and-gated" to a condition "partial braking power at right rear brake." Therefore, in this case, the condition will only be recognized if discrepancy flags are set with respect to both r5 and r6. This condition is sufficient for a finding of a fault in the rear right brake, and the dotted lines indicate that other conditions (not shown) also trigger a diagnosis of a significant fault in the rear right brake. It is to be understood that numerous other residuals and intermediate conditions are envisioned, and that faults in the other wheel brakes, the active steering actuator or the electric motor wheel accelerators can be determined in a similar manner according to the presence of one or more symptoms indicative of a fault.

Figure 5:
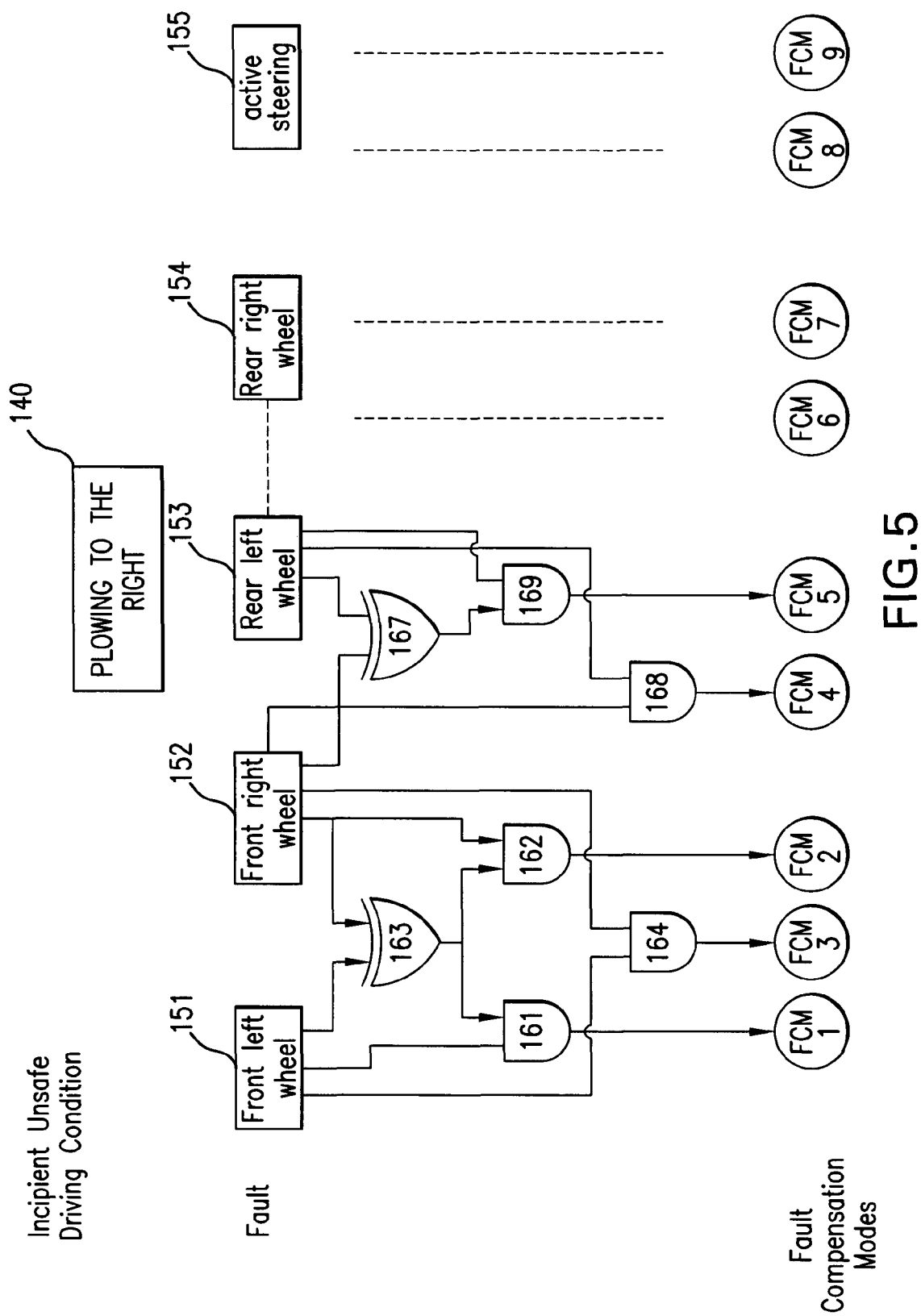
FIG. 5 illustrates an exemplary process for selecting an appropriate fault compensation mode according to the present invention.

After a fault has been diagnosed, the VDC invokes the fault-tolerant module to modify a currently-operating control algorithm or select a fault compensation mode (FCM) appropriate for a particular driving condition in light of the diagnosed fault. FIG. 5 schematically illustrates a process for selecting an appropriate FCM. Box 140 represents an incipient unsafe driving condition that triggers an intervention by the VDC. In the illustration, box 140 lists the condition "Plowing to the right." This condition is merely used as an example of one of a plurality a dangerous driving conditions that could trigger a VDC intervention. For each type of condition 140, the extended VDC according to the present invention stores a finite set of FCMs appropriate for maintaining the stability of the vehicle in the face of one or more VDC actuator faults.

Boxes 151, 152, 153, 154, and 155 represent fault diagnoses at the brake actuators of the front left wheel brake, front right wheel brake, rear left wheel brake, rear right wheel brake, and active steering, respectively. Faults can also occur at the individual electric motor accelerator actuators located at each wheel (not shown). The front left wheel box is coupled to first inputs of and-gates 161 and 162 and also to a first input of "xor-gate" 163. The front right wheel box is coupled to the right input of "xor-gate" 163, to the second input of and-gate 164 and to the second input of "and-gate" 162. The logic gate couplings are used to combine fault conditions. As depicted, the "xor-gate" 163 will output a "true" condition if either one of the front left wheel actuator or the front right wheel actuator have been diagnosed as faulty, but importantly, will output a "false" if both the front left and front right wheel actuators have a fault.

In this configuration, the output of "and-gate" 161 will then be true if only if the front left wheel actuator is faulty and the front right wheel actuator is not faulty (fault condition 1). Likewise, the output of "and-gate" 164 will be true only if the front right wheel actuator is faulty and the front left wheel actuator is not (fault condition 2). For fault condition 1, the fault tolerance module selects a fault compensation mode FCM 1 and for fault condition 2, the fault tolerance module selects fault compensation mode FCM 2. As will be discussed below, the fault compensation modes may involve such operations as increasing or decreasing brake pressure on one or more of the remaining non-faulty actuators, operating individual electric motor wheel accelerators in a forward or reverse mode, or modifying the active steering of the vehicle.

It is additionally noted that the fault tolerant VDC according to the present invention can provide fault tolerance by either providing a fault diagnosis to an operating VDC control algorithm, which then adapts or modifies various control parameters based on the fault diagnosis "on the fly" or, alternatively, the fault tolerant VDC can look up and select an appropriate pre-programmed compensation mode control strategy matched with a given fault diagnosis among a library of such pre-programmed control strategies. The operation of selecting a "fault compensation mode" is meant to encompass both of these techniques, since, in either case, the fault tolerant VDC selects various control parameters for modification in order to compensate for the diagnosed fault conditions.

Referring again to FIG. 5, while FCM 1 and FCM 2 compensate for faults in a single actuator, FCM 3 is executed when the output from "and-gate" 162 is true, that is, when both the front left wheel and the front right wheel have a fault. It is important to distinguish the failure compensation mode FCM 3 involving faults at both actuators from faults involving only a single fault at one of the actuators because the compensation mode appropriate for a single fault will often differ substantially from a compensation mode involving additional faults. For instance, a fault at the front left wheel brake actuator (FCM 1) in a given driving situation might be correctable by, for example, a modification to the braking at the front right wheel actuator. This would of course be impossible if the front right wheel actuator is also faulty. Therefore the functional state of all of the actuators is taken into account in selection of a failure compensation mode. Accordingly, the logic gate structure for selecting a fault compensation mode is extended to the other actuators. As shown in the right side of FIG. 5, the front right wheel brake actuator 152 and the rear left wheel brake actuator 153 fault conditions are "or-gated" 167 and "and-gated" 168, 169 in an analogous manner to provide failure compensation modes for when the rear left wheel brake actuator fails while the front right brake actuator is non-faulty (FCM 5) and for when both the front right wheel and rear left wheel brake actuators are faulty (FCM 4). This methodology is extended for every permutation and combination of actuator faults that can occur, e.g., faults at both the front left wheel and the rear left wheel, simultaneous faults at the front left wheel brake, front right wheel and rear right wheel brake actuators (three faults), simultaneous faults at the rear left wheel brake actuator and the active steering, simultaneous faults in brake actuators and electric motor wheel accelerators, etc. According to this scheme, the fault tolerance module can execute a control algorithm that covers both a range of unsafe driving conditions and every failure contingency that may befall the motor vehicle.

In the context of the present invention, the use of electric motor wheel accelerators is particularly advantageous because of their ability to provide both robust fault tolerance and a greater degree of control during normal driving situations. The electric motor wheel accelerators can provide extremely fast and efficient torque control because the torque provided to the wheel by each electric motor accelerator is proportional to the current provided to the motor. Since the current to the motor can be controlled precisely, the resultant torque provided by the electric motor wheel accelerators can thereby be precisely controlled as well. The torque can be applied in either a forward or reverse direction, so that the electric motor accelerators can provide redundancy for braking functions when the torque is applied against the forward momentum of the vehicle. Additionally, in-wheel electric motor accelerators of this type can be applied in all vehicle platforms including IC engine, hybrid and fully electric vehicles.

It is noted in this context that in an enhanced VDC system incorporating fault tolerance according to the present invention, the dynamic control algorithms can employ electric motor accelerators to improve vehicle performance and prevent incipient instability. Thus, in addition to providing redundancy for conventional stability control actuators, and providing extra options for fault compensation modes, the electric motor wheel accelerators can also improve VDC functionality, in general.

Figure 6C:
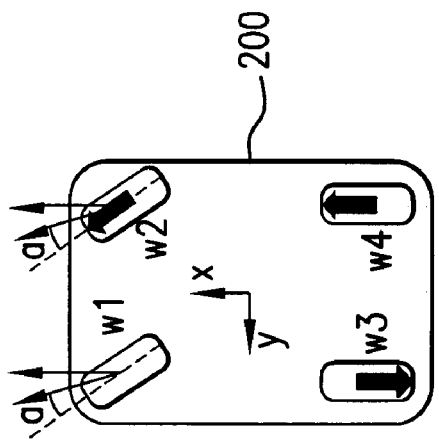
FIG. 6C illustrates an exemplary embodiment of a fault tolerant method according to the present invention for correcting the understeering condition.
Figure 6B:
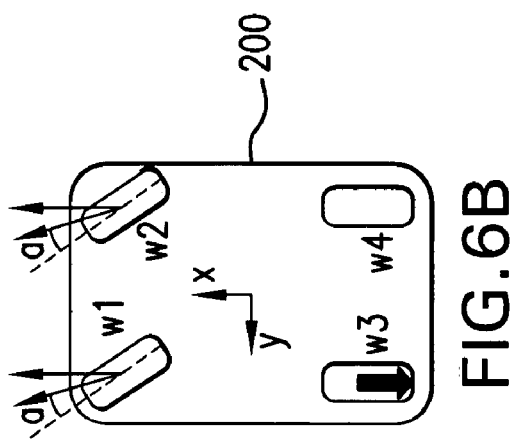
FIG. 6B illustrates a technique used by a conventional VDC system to correct the understeering through operation of a wheel brake.
Figure 6A:
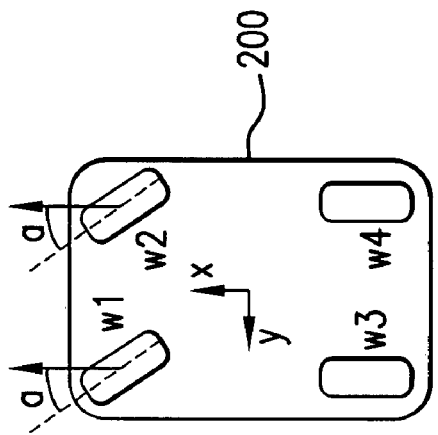
FIG. 6A illustrates an example of understeering during a turning operation of the motor vehicle toward the left.

FIGS. 6A, 6B, and 6C and 7A, 7B and 7C provide examples of respective understeering (FIGS. 6A-C) and oversteering (FIGS. 7A-C) situations that would activate an intervention by the VDC, measures taken to correct the situation by a conventional VDC system, and a fault-tolerant VDC system according to the present invention. FIG. 6A illustrates an example of an understeering condition in which a vehicle 200 does not turn enough in the intended direction indicated by the direction of the front wheels w1, w2 (to the left). One of the parameters by which this condition may be diagnosed is the large slip angles α which result between the direction of the left and right front wheels w1, w2 and the direction of the momentum of the vehicle.

FIG. 6B illustrates how a conventional VDC system or ESP may counter the understeering situation by braking the inner rear wheel w3. As shown, application of the brake at the inner rear wheel w3 has the effect of inducing a yaw moment that reduces the slip angle at the front wheels w1, w2. FIG. 6C illustrates the application of the present invention in a fault tolerant method for countering the understeering situation. In this case, in addition to braking the inner wheel w3, wheel w4 is accelerated using an electric motor wheel accelerator, and, if this measure does not completely compensate for the understeering, wheel w2 is accelerated thereafter (the acceleration provided is indicated by forward directed arrows within wheels w2, w4). Application of the accelerators at w2 (an optionally, w4) increases the speed of the correction as a greater amount of counteractive force is applied to the vehicle to reduce the slip angle. However, more significantly, the correction technique shown in FIG. 6C is fault tolerant because the additional means for correcting the understeering condition provided by the electric motor wheel accelerators at wheels w2, w4 would remain operable to correct the understeering condition in the case of a failure in the rear brake for wheel w3. The conventional VDC system would be unable to correct the condition in this case, because activation of the brakes on the remaining wheels w1, w2 and w4 would not help counteract the condition. It is noted in this context that application of the electric motor wheel accelerator in this example need not occur simultaneously with application of the brake, but rather, the in-wheel accelerators can also be used in 'reserve' and activated in a fault compensation mode when a fault condition at the brake at w3 is diagnosed.

Figure 7B:
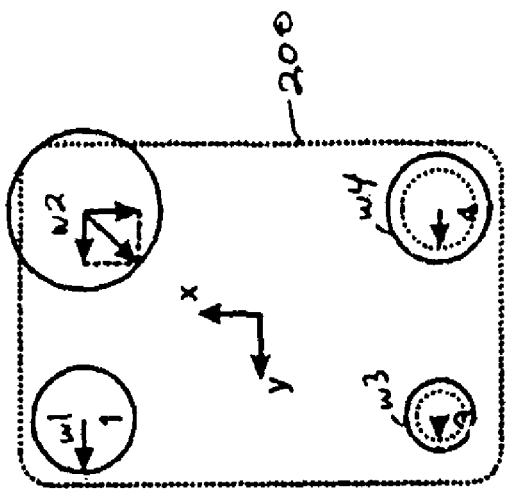
FIG. 7B illustrates a technique used by a conventional VDC system to correct the oversteering through operation of a wheel brake.
Figure 7C:
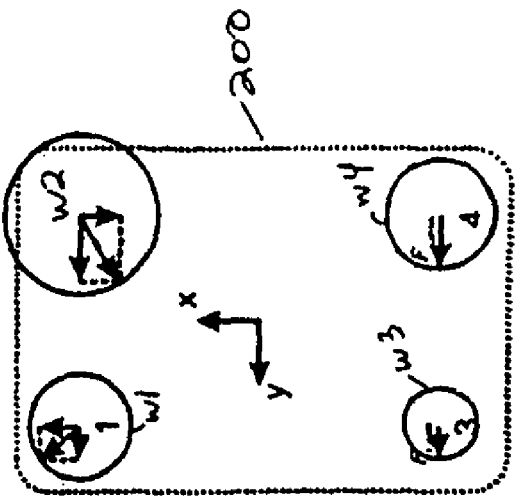
FIG. 7C illustrates an exemplary embodiment of a fault tolerant method according to the present invention for correcting the oversteering condition
Figure 7A:
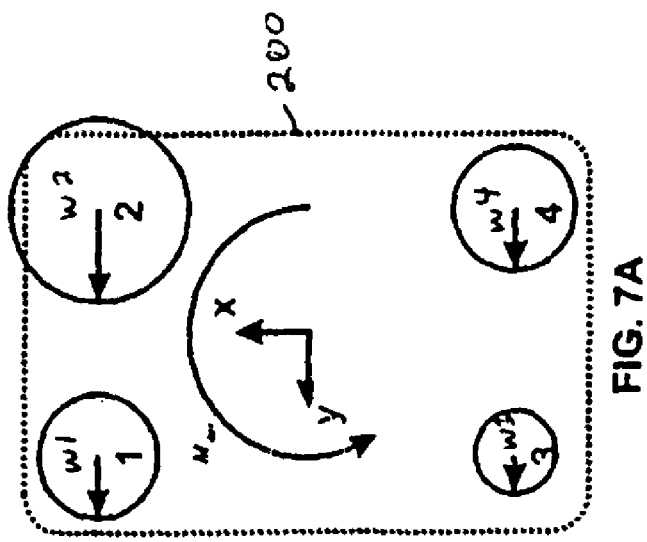
FIG. 7A illustrates an example of oversteering during a turning operation of the motor vehicle toward the left.

FIG. 7A illustrates an example of an oversteering condition in which vehicle 200 turns too much because the rear axis of the vehicle does not apply sufficient lateral force resulting in a counter-clockwise yaw moment. As shown in FIG. 7A, each wheel w1, w2, w3, w4 is depicted with a circle having a radius proportional to a maximum level of force that can potentially be applied in any given direction at the respective wheel. During a left-hand turn, the potential side force of the outer wheels w2, w4 is larger than the potential side force at the inner wheels w1, w3, due to dynamic weight transfer. Accordingly, the radii of the circles depicted at outer wheels w2, w4 are larger than those of inner wheels w1, w3. However, under normal driving conditions, the potential forces of the front axis wheels w1, w2 are balanced by the potential force of the rear axis wheels w3, w4 so that no turning moment is generated. In the illustrated example, the radius of the circle at inner rear wheel w3 is smaller than that of the inner front wheel w1, and likewise, the radius of the circle at outer rear wheel w4 is smaller than that of the outer front wheel w2, indicating an oversteering condition.

FIG. 7B illustrates how a conventional VDC system or ESP may counter the oversteering situation by braking the outer front wheel w2. As shown by the vector diagram in w2 in FIG. 7B, braking wheel w2 applies a force acting in a rearward direction and reduces the lateral force at the wheel acting toward the left, reducing the overall moment on the vehicle 200. This strategy suffers from the fact that braking wheel w2 further decreases the load on the rear axis (reducing the radii of circles at w3, w4 shown as dotted lines) which can lead to further instability, and is also intolerant to a fault at the brake of wheel w2.

FIG. 7C illustrates the application of the present invention in a fault tolerant method for countering the oversteering situation. In this case, an in-wheel motor accelerator at inner front wheel w1 is activated. As with the understeering situation, the in-wheel accelerator at w1 can be activated simultaneously with braking of wheel w2 to enhance performance, or it can be employed in a fault compensation mode if a fault at the brake of wheel w2 is diagnosed. As shown in the vector diagram in wheel w1, accelerating the front wheel produces a forward force that shifts the resultant force at w1 from leftwards to a diagonal direction. This counteracts the effect of the rearwardly acting force of the brake at w2 in reducing the load on the rear axis, and also contributes to reducing the overall turning moment on the vehicle by reducing the lateral acceleration at wheel w1. Fault tolerance is provided in the case that the brake at w2 fails, since the in-wheel motor accelerator at w1 acting alone can substitute to an extent for the effects of the brake at w2.

In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims. For example, the method of the present invention can be applied using other torque distribution systems in addition to in-wheel motor accelerators, and also can be applied in vehicles using independent four-wheel drive.

What is claimed is:

1. A fault tolerant vehicle dynamics control system for a motor vehicle comprising:
   vehicle dynamics control actuators;
   a fault tolerance module configured to:
      receive an indication of a fault in at least one of the vehicle dynamics control actuators; and
      determine which of a plurality of predefined algorithms is mapped to the indicated fault, each of the plurality of predefined algorithms defining a respective fault compensation mode; and
   an extended vehicle dynamics control that executes the determined predefined algorithm to maintain the stability of the motor vehicle in light of the received fault indication by controlling remaining operable actuators to compensate for the at least one fault.

2. The fault tolerant vehicle dynamics control system of claim 1, wherein the extended vehicle dynamics control stores the algorithms corresponding to fault compensation modes.

3. The fault tolerant vehicle dynamics control system of claim 1, further comprising:
   self-diagnostic actuator sensors allocated to each of the vehicle dynamics control actuators operable to detect a fault in the vehicle dynamics control actuators, each self-diagnostic actuator sensor providing a fault indication to the fault tolerance module when a fault is detected.

4. The fault tolerant vehicle dynamics control system of claim 1, further comprising:

at least one sensor for detecting at least one vehicle dynamics parameter of the motor vehicle; and a fault isolation module, the fault isolation module:
- a) receiving vehicle dynamics information from the sensors and driver input command information;
- b) determining from the at least one vehicle dynamics parameter and driver input command information whether fault symptoms exist at the vehicle dynamics control actuators;
- c) diagnosing which of the vehicle dynamics control actuators are faulty; and
- d) sending an indication of which vehicle dynamics control actuators are faulty to the fault tolerance module.

5. The fault tolerant vehicle dynamics control system of claim 4, wherein the fault isolation module includes a model-based fault detection module and a signal-based fault detection module.

6. The fault tolerant vehicle dynamics control system of claim 5, wherein the signal-based fault detection module performs at least one of threshold checks, range plausibility checks and vibration signal-model based checks with respect to a detected vehicle dynamics parameter to detect a fault symptom.

7. The fault tolerant vehicle dynamics control system of claim 5, wherein the model-based fault detection module employs at least one of parameter estimation techniques, state estimation techniques and parity equations to detect a fault symptom.

8. The fault tolerant vehicle dynamics control system of claim 4, further comprising:

electric motor wheel accelerators activatable by the extended vehicle dynamics control controller during execution of a selected fault compensation mode.

9. The fault tolerant vehicle dynamics control system of claim 1, wherein the plurality of predefined algorithms includes, for each possible combination of actuators in which a fault can occur, a respective algorithm that defines a respective fault compensation mode executed when a fault occurs in the respective combination of actuators.

10. The fault tolerant vehicle dynamics control system of claim 1, wherein the system is configured to select one of the plurality of predefined algorithms based on a combination of (a) an identification of one of a plurality of predefined unsafe driving conditions and (b) an identification of in which one or more of the vehicle dynamics control actuators the fault occurred.

11. The fault tolerant vehicle dynamics control system of claim 10, wherein, for each of at least one possible combination of actuators in which a fault can occur, a respective plurality of predefined algorithms corresponds to the respective combination, each of the respective plurality of predefined algorithms corresponding to a respective predefined unsafe driving condition.

* * * * *